United States Patent
Kluttz et al.

(10) Patent No.: US 10,767,033 B2
(45) Date of Patent: Sep. 8, 2020

(54) ASPHALT COMPOSITIONS AND METHODS OF MAKING SAME

(71) Applicant: Kraton Polymers LLC, Houston, TX (US)

(72) Inventors: Robert Q Kluttz, Houston, TX (US); Erica Jellema, Amsterdam (NL); Donn A. Dubois, Houston, TX (US); Sebastian Puchalski, Houston, TX (US); Carl L. Willis, Houston, TX (US); Christopher M. Lubbers, Houston, TX (US)

(73) Assignee: Kraton Polymers LLC, Houston, TX (US)

( * ) Notice: Subject to any disclaimer, the term of this patent is extended or adjusted under 35 U.S.C. 154(b) by 70 days.

(21) Appl. No.: 15/984,127

(22) Filed: May 18, 2018

(65) Prior Publication Data

US 2018/0334554 A1    Nov. 22, 2018

Related U.S. Application Data

(60) Provisional application No. 62/508,065, filed on May 18, 2017.

(51) Int. Cl.

| | |
|---|---|
| *C08L 9/06* | (2006.01) |
| *C04B 24/36* | (2006.01) |
| *C08L 53/02* | (2006.01) |
| *C04B 26/26* | (2006.01) |
| *C04B 24/26* | (2006.01) |
| *C09D 109/06* | (2006.01) |
| *C09J 109/06* | (2006.01) |
| *C08F 297/02* | (2006.01) |
| *C08L 95/00* | (2006.01) |
| *C04B 111/00* | (2006.01) |
| *C04B 103/00* | (2006.01) |

(52) U.S. Cl.
CPC ............ *C08L 9/06* (2013.01); *C04B 24/2676* (2013.01); *C04B 24/36* (2013.01); *C04B 26/26* (2013.01); *C08F 297/023* (2013.01); *C08L 53/02* (2013.01); *C08L 95/00* (2013.01); *C08L 95/005* (2013.01); *C09D 109/06* (2013.01); *C09J 109/06* (2013.01); *C04B 2103/0061* (2013.01); *C04B 2103/0075* (2013.01); *C04B 2111/00586* (2013.01); *C04B 2201/10* (2013.01); *C08L 2205/025* (2013.01); *C08L 2205/03* (2013.01); *C08L 2555/84* (2013.01)

(58) Field of Classification Search
CPC ..... C08L 53/02; C08L 53/025; C08F 297/023
See application file for complete search history.

(56) References Cited

U.S. PATENT DOCUMENTS

| | | | |
|---|---|---|---|
| 5,420,203 A | 5/1995 | Dillman et al. | |
| 5,639,831 A | 6/1997 | Himes et al. | |
| 7,125,940 B2 | 10/2006 | Willis | |
| 7,622,519 B2 | 11/2009 | Kluttz et al. | |
| 7,728,074 B2 | 6/2010 | Kluttz et al. | |
| 2007/0037907 A9 | 2/2007 | Zhou et al. | |
| 2009/0105376 A1 | 4/2009 | Korenstra et al. | |
| 2009/0299010 A1* | 12/2009 | Kluttz | C08L 95/00 525/89 |
| 2012/0160399 A1 | 6/2012 | Pratte et al. | |
| 2018/0066402 A1* | 3/2018 | Sakai | C08K 5/548 |

OTHER PUBLICATIONS

Hamersky, et al., "Phase Behavior of Triblock Copolymers Varying in Molecular Asymmetry", Physical Review Letters, Oct. 2005, 168306-1-168306-4.

* cited by examiner

*Primary Examiner* — Jeffrey C Mullis
(74) *Attorney, Agent, or Firm* — Ramesh Krishnamurti

(57) ABSTRACT

A coupled block copolymer composition with a combination of high viscosity at manufacturing, finishing and handling conditions, low viscosity at asphalt blending conditions and suitable viscosity stability is provided for use in asphalt compositions. The composition comprises: (i) a diblock copolymer, (ii) at least a linear triblock copolymer having a peak molecular weight that is 1.5 to 3.0 times the peak molecular weight of the diblock copolymer, and (iii) at least a multiarm coupled block copolymer having a peak molecular weight that is 1.5 to 9.0 times the peak molecular weight of the diblock copolymer, and mixtures thereof. The block copolymer composition is characterized as having a melt viscosity at 110° C. or less of greater than 2.0E7 Poise and a coupling efficiency after 24 hours at 180° C. is less than 25%.

19 Claims, No Drawings

ASPHALT COMPOSITIONS AND METHODS OF MAKING SAME

RELATED APPLICATIONS

This application claims priority from U.S. Provisional Application No. 62/508,065, with a filing date of May 18, 2017, the entire disclosures of which is incorporated herein by reference for all purposes.

FIELD

The present disclosure relates to the use of styrenic block copolymers in asphalt compositions.

BACKGROUND

In formulating asphalt compositions suitable for use in applications such as road paving, styrenic block copolymers that contain high diblock content are desirable for easy blending and low viscosity. Further, it is desirable for the resulting asphalt composition to have suitable viscosity stability. For manufacturing, styrenic block copolymers that contain high triblock content and are high in viscosity are desirable for easy finishing and handling.

There is a need for an improved polymer composition with a combination of high viscosity at manufacturing, finishing and handling conditions, low viscosity at asphalt blending conditions and suitable viscosity stability in asphalt compositions.

SUMMARY

In one aspect, a composition of coupled styrenic block copolymers along with their methods of preparation is disclosed. The coupled styrenic block copolymers composition comprises: a diblock copolymer comprising one block of a monovinylaromatic hydrocarbon and one block of a conjugated diene having a peak molecular weight from 30,000 to 78,000, each block copolymer having a vinyl content from 8 to 80 mol percent based on the number of repeat monomer units in the conjugated diene block, a linear triblock copolymer having a peak molecular weight that is 1.5 to 3.0 times the peak molecular weight of the diblock copolymer, and a multiarm block copolymer having a peak molecular weight that is 1.5 to 9.0 times the peak molecular weight of the diblock copolymer, and mixtures thereof, wherein the composition is characterized as having a starting coupling efficiency such that the composition has a melt viscosity at 110° C. or less of greater than 2.0E7 Poise and a coupling efficiency after 24 hours at 180° C. is less than 25%.

In another aspect, the coupled styrenic block copolymer composition has a starting coupling efficiency in a range of 45-90%.

DESCRIPTION

The following terms will be used throughout the specification and will have the following meanings unless otherwise indicated.

"Asphalt binder" refers to a tarlike mixture of hydrocarbons derived from petroleum naturally or by distillation and used primarily for road surfacing and roofing. Asphalt binder is defined by ASTM as a dark brown to black cement-like residuum obtained from the distillation of suitable crude oils. Asphalts binder characteristically contains saturates, aromatics, resins and asphaltenes. "Asphalt", "asphalt binder", "binder" and "bitumen" are often used interchangeably to mean both natural and manufactured forms of the material.

"Emulsion" generally refers to a multiphase material in which all phases are dispersed in a continuous aqueous phase. The aqueous phase comprises surfactants, acid, base, thickeners, and other additives. The dispersed phase comprises thermoplastic natural and synthetic polymers, waxes, asphalt, other additives including rheology modifier(s), optionally petroleum based oils or mixtures thereof, herein collectively referred to as the "oil phase." High shear and energy can be used to disperse the oil phase in the aqueous phase using apparatus such as colloidal mills.

"Pavement preservation" refers to a proactive maintenance of roads to prevent them from getting to a condition where major rehabilitation or reconstruction is necessary. A pavement preservation application is any of fog seal, slurry seal, micro surfacing, chip seal, scrub seal, cape seal, and combinations thereof wherein an asphalt emulsion with optional additives is applied onto an existing road or pavement as a "seal" to seal the surface. In some embodiments, polymer is added to the asphalt emulsion to provide better mixture properties.

"Fog seal" is a pavement preservation application of an asphalt emulsion via a spray application ("fogging"). Fog seals are sometimes sanded after spray application in order to improve the skid resistance of the treated pavement surface.

"Slurry seal" refers to a pavement preservation application wherein a mixture of water, asphalt emulsion, and aggregate is applied to an existing asphalt pavement surface.

"Micro surfacing" refers to a form of slurry seal, with the application of a mixture of water, asphalt emulsion with additives, aggregate (very small crushed rock), and additives to an existing pavement surface. A difference between slurry seal and micro surfacing is in how they "break" or harden. Slurry relies on evaporation of the water in the asphalt emulsion. The asphalt emulsion used in micro surfacing contains additives which allow it to chemically break without relying on the sun or heat for evaporation to occur, for the surface to harden quicker than with slurry seals. Also, micro surfacing emulsions are required to be polymer-modified, whereas slurry seal emulsions can be polymer-modified or unmodified. If slurry seals are polymer-modified, then the loading level is typically less than that of a micro surfacing emulsion.

"Chip seal" refers to a pavement preservation application wherein first asphalt emulsion is applied, followed immediately by a layer(s) of crushed rock. "Chip seal" gets its name from the "chips" or small crushed rock placed on the surface.

"Scrub seal" refers to a pavement preservation application that is very close to a chip seal treatment where asphalt emulsion and crushed rock are placed on an asphalt pavement surface. The only difference is that the asphalt emulsion is applied to the road surface through a series of brooms placed at different angles. These brooms guide the asphalt emulsion into the pavement distresses to ensure sealing the road. These series of brooms, known as a "scrub broom", give the treatment its title, "scrub seal." Additionally, scrub seal emulsions typically contain rejuvenating agents, either petroleum-based and/or natural/bio-additives, as well as polymers. For this reason, scrub seal emulsions are typically referred to as polymer-modified rejuvenating emulsions or PMRE's.

"Cape seal" is a combination of applications, i.e., an application of a chip or scrub seal, typically followed by the application of slurry seal or micro surfacing at a later date to act as the primary wearing or surface course.

"Rehabilitation" refers to applications carried out with pavements that exhibit distresses beyond the effectiveness of pavement preservation techniques, but not too severe to warrant the cost of complete reconstruction. As pavement ages, it will deteriorate due to weathering and traffic loading, but not to the point of complete reconstruction, so rehabilitation techniques can be performed.

"Cold in-place recycling" or CIR refers to applications involving a milling machine with a paver mixer, wherein the milling machine breaks and pulverizes a thin amount of the top layer of the old pavement. The material is crushed and screened to the proper size and asphalt emulsions and/or additives including rheology modifiers or rejuvenators are mixed in to rejuvenate the material to give more life. In some applications, virgin aggregate can be added and spread on the existing surface. The material is picked up by the paver and spread, then compacted using known methods, e.g., steel-wheel, pneumatic-tire, or vibratory rollers.

"Full-depth reclamation" or FDR is similar to CIR, but involves milling to a thicker, underlying pavement depth prior to rehabilitation or partial reconstruction.

"Rheology modifier" generally refers to a composition or blend that can be used in asphalt compositions for road and pavement applications including but not limited to new construction, partial or complete re-construction, rehabilitation, preservation, CIR, e.g., in asphalt emulsion compositions, or in combination with reclaimed asphalt (or their mixtures with virgin binder and/or virgin asphalt) to modify rheological properties of the binder or reclaimed asphalt and, in some cases, restore some or most of the original properties of virgin binder or virgin asphalt.

% Recovery refers to value obtained from AASHTO T350 test. % recovery characterizes elasticity of asphalt binder. High % recovery is characteristic of asphalt binder samples modified with an elastomeric modifier such as SBS.

AASHTO=American Association of State Highway and Transportation Officials

MSCR=Multiple Stress Creep Recovery

RTFO=rolling thin film oven

DSR=dynamic shear rheometer

AASHTO M320-10 (2015) Standard Specification for Performance-Graded Asphalt Binder. This specification includes test methods AASHTO T315, T240-13 and T316-16.

AASHTO M332-14 Standard Specification for Performance-Graded Asphalt Binder Using Multiple Stress Creep Recovery (MSCR) Test AASHTO T240-13 (ASTM D2872-04) Standard Method of Test for Effect of Heat and Air on a Moving Film of Asphalt Binder (Rolling Thin-Film Oven Test)

AASHTO T315-12 Standard Method of Test for Determining the Rheological Properties of Asphalt Binder Using a Dynamic Shear Rheometer (DSR)

AASHTO T316-16: Standard Method of Test for Viscosity Determination of Asphalt Binder Using Rotational Viscometer AASHTO T350-14 Standard Method of Test for Multiple Stress Creep Recovery (MSCR) of Asphalt Binder Using a Dynamic Shear Rheometer (DSR)

ASTM D36: Standard Test Method for Softening Point of Bitumen (Ring-and-Ball Apparatus)

"Molecular weight" refers to the true molecular weight in g/mol of the polymer or block of the copolymer, which can be measured with gel permeation chromatography (GPC) using polystyrene calibration standards according to ASTM 5296-11. It will be appreciated by those skilled in the art that GPC analysis reports column retention times that are then converted to standardized molecular weights, usually using polystyrene standards. These "styrene equivalent" molecular weights are commonly used in the polymer industry. For the purposes of this disclosure, peak molecular weights are reported as true molecular weights based on molar mass rather than GPC "styrene equivalent" retention times.

"Diblock copolymer" refers to the proportion of free diblock present in the composition.

"Coupling efficiency" refers to the number of molecules of coupled polymer divided by the number of molecules of coupled polymer plus the number of molecules of uncoupled polymer. For example, if a coupling efficiency is 80%, then the polymer will contain 20% diblock and 80% triblock and multiarm block.

"Vinyl content" refers to the polymer product that is made when 1,3-butadiene is polymerized via a 1,2-addition mechanism, resulting in a monosubstituted olefin, or vinyl group, adjacent to the polymer backbone. The effects of 3,4-addition polymerization of isoprene on the final properties of any block copolymer will be similar to those from 1,2-addition of butadiene.

The disclosure encompasses coupled styrenic block copolymer compositions (SBC) comprising: a diblock copolymer, a linear triblock coupled copolymer, and a multiarm coupled block copolymer. At a temperature of less than 110° C., the composition has a melt viscosity of greater than 2.0E7 Poise, facilitating the processing and transport. The coupled composition is prepared by coupling a diblock copolymer with a coupling agent such that at a temperature of at least 180° C. after at least 24 hours, a sufficient amount of the triblock copolymers and/or the multiarm coupled block copolymers will decouple such that the coupling efficiency is less than 25%, allowing the composition to be conveniently processed by customers in end-use road and construction applications. It will be well-recognized to those skilled in the art that the coupling agents in this disclosure are capable of reacting with two diblock copolymers (e.g., S-B) to produce a triblock copolymer (e.g., S-B-B-S or (S-B)2). It will also be well-recognized that there are usually trace side reactions that will result in species with three or more arms (e.g., (S-B)n where n>2). In one embodiment, the multi-arm species comprise less than 5% of the total mass of the coupled styrenic block copolymer composition, thus the peak molecular weight of the triblock peak is reported as the polymer peak molecular weight.

Block copolymer Composition—Coupled Uniform Vinyl UVB: In one embodiment, the styrenic block copolymer is a uniform vinyl coupled composition designated as UVB, comprising: a styrenic diblock copolymer of formula S-B, a linear triblock copolymer of formula S-B-B-S, and a multi-arm coupled block copolymer of formula (S-B)nX. In the formulae, S is a monoalkenyl arene block; B is a conjugated diene block; n is an integer from 2 to 6 so that n=2 is the triblock and n>2 is the multiarm; and X is the residue of a coupling agent. In one aspect, the UVB composition comprises mixtures of diblock copolymers and linear triblock copolymers and multi-arm coupled block copolymers.

In one embodiment, the ratio of the diblock copolymer to linear triblock copolymer, multi-arm coupled block copolymer and mixtures thereof will be from 5:4 to 1:10 or, in terms of coupling efficiency, from 45% to 90%. Alternatively, the ratio of the diblock copolymer to linear triblock copolymer, multi-arm coupled block copolymer, and mixtures thereof will range from 1:1 to 1:4 or, in terms of coupling efficiency, from 50% to 75%.

In one embodiment, both the diblock copolymer and the multi-arm coupled block copolymer have a vinyl content from 8 mol % to 60 mol % and a polystyrene content from 20 mol % to 35 mol %, based on the number of repeat monomer units in the conjugated diene block of the specific copolymer. The ratio of diblock copolymer to multi-arm coupled block copolymer is from 5:4 to 1:10, alternatively, from 1:1 to 1:4. In terms of coupling efficiency, the coupling efficiency is from 45% to 90%, alternatively, from 50% to 75%.

The peak molecular weight of the UVB linear triblock copolymers and/or multi-arm coupled block copolymers is dependent upon the peak molecular weight of the diblock copolymers utilized. In some embodiments, the block copolymer has a peak molecular weight from 30,000 g/mol to 200,000 g/mol, alternatively from about 35,000 g/mol to about 130,000 g/mol, alternatively from about 35,000 g/mol to about 100,000 g/mol, or alternatively from about 40,000 g/mol to about 78,000 g/mol. The peak molecular weight of the linear triblock copolymers is from 1.5 to 3.0 times the peak molecular weight of the diblock copolymer in one embodiment, and 1.8 to 2.5 in a second embodiment. The peak molecular weight of the multi-arm coupled block copolymer is from 1.8 to 5.0 times the peak molecular weight of the diblock copolymer. In aspects where the composition comprises a multi-arm coupled block copolymer, the peak molecular weight of the multi-arm coupled block copolymer ranges from 1.5 to 9.0 times the peak molecular weight of the diblock copolymer, or from 1.8 to 5.0 times the peak molecular weight of the diblock copolymer.

The monoalkenyl arene S content of the UVB polymeric composition is in the range of from 10% wt. to 55% wt., alternatively, from 15% wt. to 45% wt., alternatively from 22% wt. to 37% wt., or alternatively from 25% wt. to 35% wt. based on the total weight of UVB polymeric composition.

Block Copolymer Composition—Coupled Distributed Vinyl Form DVB: In one embodiment, the styrenic block copolymer is a distributed vinyl coupled composition comprising uncoupled copolymers and coupled copolymers designated as DVB, with a mixture of polymers having a formula S-B1-B2 and (S-B1-B2)nX. In another embodiment, the DVB polymer comprises mixtures of copolymers having an additional polybutadiene block B1', as represented by formulas S-B1-B1'-B2 and (S-B1-B1'-B2)nX.

In the formulae, S is a monoalkenyl arene block; each of B1, B1' (if present) and B2 is a conjugated diene block; n is an integer from 2 to 6, alternatively from 2 to 4, or alternatively 2; and X is the residue of a coupling agent.

In one embodiment, the ratio of the diblock copolymer to linear triblock copolymer, multi-arm coupled block copolymer or mixture thereof will be from 5:4 to 1:10 or, in terms of coupling efficiency, from 45% to 90%. Alternatively, the ratio of the diblock copolymer to linear triblock copolymer, multi-arm coupled block copolymer, or mixture thereof will range from 1:1 to 1:4 or, in terms of coupling efficiency, from 50% to 75%.

The polybutadiene is present in blocks, or segments, which comprise a range of vinyl content. The first or B1 polybutadiene block comprises less than about 20 mol % of the polybutadiene units in the polymer block having a 1,2-addition configuration; or alternatively from 5-15 mol %; or 7-15 mol %. In one embodiment, the condensed polybutadiene units of the second or B2 polybutadiene block comprises greater than about 25 mol % of the polybutadiene units having a 1,2-addition configuration, alternatively 25-80 mol %, alternatively 40-75 mol %, or, alternatively 50 mol %-65 mol %.

In an embodiment with B1' being present, B1' comprises a polybutadiene block having a vinyl content that tapers from less than about 20 mol % at the first end of the B1' block (adjacent to the monoalkenyl arene block (S)) to a vinyl content that is greater than about 25 mol % at the second end of the B1' block (distal from the monoalkenyl arene block (S)). In this embodiment, B1 is a polybutadiene block having a vinyl content of less than 20 mol %, B2 is a polybutadiene block having a vinyl content of greater than 25 mol %.

"Taper" refers to the distribution of the vinyl content such that the end of the B1' block adjacent to the monoalkenyl arene block has less than about 20 mol % vinyl content and the opposite end of the block has greater than about 25 mol % vinyl content. In an aspect, the vinyl content of the polybutadiene block progressively increases across the expanse of the block. In a further aspect, the B1' block comprises regions of low vinyl content near the S block and these regions of low vinyl content is followed by regions of high vinyl content distal from the S block, with the vinyl content increasing across the expanse of the polybutadiene block. In other words, the vinyl content would start at an amount less than about 20 mol % and would on average progressively increase throughout the block.

In one embodiment, the vinyl content at the first end of the B1' block ranges from about 7 mol % to about 15 mol % of the polybutadiene units having 1,2-addition configuration and on average increases throughout the B1' block, such that at least the last about 10% to about 49% of the block, or alternatively at least the last about 25% to about 49% of the B1' block, comprises a vinyl content in which the proportion of condensed polybutadiene units have a 1,2-addition configuration is greater than about 25 mol %, alternatively from about 25 mol % to about 80 mol %, alternatively from about 40 mol % to about 75 mol, or, alternatively from about 50 mol % to about 65 mol %. In an aspect, the monoalkenyl arene content of the DVB polymeric composition is from about 10% wt. to about 40% wt., alternatively from about 18% wt. to about 35% wt., or, alternatively from about 19% wt. to about 32% wt. based on the total weight of the copolymer.

In some embodiments of the S-B1-B2 and (S-B1-B2) nX formulae, the ratio of B1 to B2 is 5:1 to 2:3. In other words, B1 is present in an amount (weight percent) of 40% to 83% of the total of the B1-B2 segment and B2 is present in an amount (weight percent) of 17% to 60% of the total of the B1-B2 segment.

In some embodiments of the S-B1-B1'-B2 and (S-B1-B1'-B2)nX formulae, the wt. % of B1, B1' and B2 are, respectively, 0% to 83%, 0% to 100% and 0% to 60%. In other terms, the tapered block B1' between the B1 block and the B2 block may vary from 0% to 100% with the extreme limit of 0% being the S-B1-B2 embodiment, and the other extreme 100% limit being the S-B1' embodiment, with the taper extending from the polystyrene block to the end of the polybutadiene block.

The peak molecular weight (MW) of the DVB linear triblock copolymers and/or multi-arm coupled block copolymers is dependent upon the peak MW of the diblock copolymers utilized. In some embodiments, the block copolymer has a peak MW from 30,000 g/mol to 200,000 g/mol, alternatively from about 35,000 g/mol to about 130,000 g/mol, alternatively from about 35,000 g/mol to about 100,000 g/mol, or alternatively from about 40,000 g/mol to about 78,000 g/mol. The peak MW of the linear triblock copolymers is from 1.5 to 3.0 times the peak MW of the diblock copolymer in one embodiment, and 1.8 to 2.5 in a second embodiment. The peak MW of the multi-arm coupled block copolymer is from 1.8 to 5.0 times the peak molecular weight of the diblock copolymer. In aspects where the composition comprises a multi-arm coupled block copolymer, the peak MW of the multi-arm coupled block copolymer will range from 1.5 to 9.0 times the peak MW of the diblock copolymer, or from 1.8 to 5.0 times the peak MW of the diblock copolymer.

Monoalkenyl arene block S: In some aspects, the monoalkenyl arene block S comprises any monoalkenyl arene. In other aspects, the monoalkenyl arene block comprises styrene, o-methylstyrene, p-methyl styrene, p-tert-butyl styrene, 2,4-dimethylstyrene, alpha-methylstyrene, vinylnaphthalene, vinyltoluene and vinylxylene or mixtures thereof. In other aspects, the monoalkenyl arene block is styrene. In aspects when styrene is the only monoalkenyl arene in use, the styrene is used as a substantially pure monomer. In other aspects, styrene is the major component in mixtures with minor proportions of structurally related vinyl aromatic monomers. Structurally related vinyl aromatic monomers which is used as the minor component in mixtures having a major component comprising styrene is o-methylstyrene, p-methylstyrene, p-tert-butylstyrene, 2,4-dimethylstyrene, α-methylstyrene, vinylnaphtalene, vinyltoluene, vinylxylene or combinations thereof. In some aspects, the proportion of the vinyl aromatic monomers comprising the minor component of a mixture comprising styrene does not exceed 10% wt.

In some aspects, the peak MW of each monoalkenyl arene block is from 5,000 g/mol to 50,000 g/mol, alternatively from 10,000 g/mol to 25,000 g/mol or alternatively from 14,000 g/mol to 18,000 g/mol.

In one embodiment, the monoalkenyl arene content of the copolymers (in the present case with regard to each individual copolymer) is from about 10% wt. to about 40% wt., alternatively from about 18% wt. to about 35% wt. by weight, or, alternatively from about 23% wt. to about 34% wt. based on the total weight of the composition.

Conjugated diene block B (Bx): The conjugated diene block B (or any of B1, B1', B2) comprises any conjugated diene, alternatively the conjugated diene has from four to eight carbon atoms. In an aspect, the conjugated diene is a butadiene monomer or an isoprene monomer that is a substantially pure monomer or contains minor proportions, up to 10% by weight, of structurally related conjugated dienes, such as 2,3-dimethyl-1,3-butadiene, 1,3-pentadiene and 1,3-hexadiene. Alternatively, substantially pure butadiene or substantially pure isoprene is utilized for the preparation of the conjugated diene blocks, or alternatively substantially pure butadiene. It is to be understood that the conjugated diene block also comprises a mixture of butadiene and isoprene monomers. In one embodiment, the polybutadiene block of the above-noted formulas is a polybutadiene monomer that is a substantially pure monomer or contains minor proportions, up to about 10% by weight, of structurally related conjugated dienes. In an aspect, the polybutadiene is pure.

In some embodiments, the peak MW of each conjugated diene block is from 10,000 g/mol to 200,000 g/mol, alternatively from 20,000 g/mol to 100,000 g/mol or, alternatively from 25,000 g/mol to 60,000 g/mol. In one embodiment, each diblock copolymer has a peak MW from 30,000 g/mol to 78,000 g/mol, alternatively from 40,000 g/mol to 78,000 g/mol.

Optional Components: In one embodiment, the composition when comprises additives such as antioxidants, e.g., primary antioxidants and/or secondary antioxidants, e.g., a non-staining antioxidant. Examples include but are not limited to hindered phenols, arylamines, phosphites and thiosynergists. In one embodiment, primary antioxidants are added in amounts ranging from 0.1% wt. to 1.5% wt. or alternatively from 0.3% wt. to 1% wt. based on the total weight of the composition. In another embodiment, secondary antioxidants are included in amounts ranging from 0.1% wt. to 2.5% wt. or alternatively from 0.5% wt. to 2% wt.

Process for Making: In one embodiment, a diblock copolymer is prepared via polymerization wherein a polystyrene block is polymerized followed by a polybutadiene block or blocks. In a UVB embodiment with low, less than 15% vinyl content, no vinyl modifier is used. In a UVB embodiment with high, greater than 25% vinyl content, a vinyl modifier is added all at once at the beginning of the butadiene polymerization. In a DVB embodiment with a S-B1-B2 structure, a vinyl modifier is added all at once after the butadiene is partially polymerized. In a DVB embodiment with a S-B1-B1'-B2 structure, the vinyl modifier is metered in after the butadiene is partially polymerized. The amount of modifier utilized will depend on the exact modifier being used. In general, the modifier will be added in an amount from 0.005% to 10% basis solvent. The block copolymers thus prepared (S-B, S-B1-B2, or S-B1-B1'-B2) then serve as intermediate living block copolymers which are subsequently coupled by means of a multivalent coupling agent.

In another embodiment to achieve compositions with polybutadiene block having a high vinyl content, a microstructure control agent can be used to closely control the vinyl content of a polymer, in some cases even varying the vinyl content within different regions within the diene block, as disclosed in U.S. Pat. No. 7,125,940, incorporated herein by reference in its entirety.

Other suitable anionic living polymerization methodology, as illustrated for example in U.S. Pat. Nos. 7,728,074 and 7,622,519, incorporated herein by reference, can also be used to prepare the diblock copolymer. In one embodiment, the monomers can be brought in contact with an organoalkali metal compound, e.g., organolithium compounds having the general formula RLi, in a suitable solvent at a temperature from −150° C. to 300° C., alternatively at a temperature within the range of from 0° C. to 100° C. The vinyl content of the conjugated diene portion can be enhanced with polar compounds such as ethers, amines and other Lewis bases such as dialkylethers of glycols. In an embodiment, modifiers to enhance the vinyl content of the conjugated diene portion comprise a dialkyl ether of ethylene glycol containing the same or different terminal alkoxy groups, and optionally bearing an alkyl substituent on the ethylene radical, such as monoglyme, diglyme, diethoxyethane, 1,2-diethoxypropane, 1-ethoxy-2,2-tert-butoxyethane or alternatively 1,2-diethoxypropane.

After a diblock copolymer is prepared, it is further coupled with a coupling agent. In one embodiment, the composition is prepared by contacting a diblock copolymer composition with a coupling agent. For example, contacting an uncoupled styrenic block copolymer composition (e.g., an uncoupled UVB composition) with a coupling agent. Generally, the coupling agents comprise compounds characterized by Formula I:

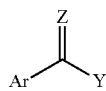

wherein Y is R, OR, SR', or X (where X=F, Cl, Br and/or I); Z is O, S, or NW" where R, R', and R" are independently an alkyl group or an aryl group; and Ar is an aromatic group that comprises one or more rings. In an embodiment, Ar is substituted, alternatively Ar is unsubstituted. An example, coupling agent compound is characterized by the following general structure:

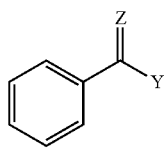

wherein Y is R, OR, SR', or X (where X=F, Cl, Br and/or I); Z is O, S, or NW'"; R, R', and R" each independently comprises an alkyl group or aryl group. In an embodiment, the coupling agent comprises methyl benzoate (MBZ).

In one embodiment, the amount of coupling agent relative to the amount of monoalkyl arene utilized ranges from 0.02 to 0.80% wt., alternatively 0.05-0.60 wt. %, alternatively from 0.15-0.40% wt. and alternatively from 0.20-0.30% wt.

In an embodiment, the coupling agent (e.g., MBZ) is contacted with the styrenic block copolymer composition at any point during preparation of the composition. For example, addition of the coupling agent occurs after completing the addition of the conjugated diene, or after completing the addition of the conjugated diene and after at least 10 minutes have passed, alternatively after at least 20 minutes have passed, alternatively after at least 30 minutes have passed or alternatively after at least 40 minutes have passed. In another embodiment, the contact occurs when the reaction mixture is at a temperature of 70° C. or less, alternatively of 60° C. or less. Contacting an uncoupled styrenic diblock of a UVB or DVB composition with a coupling agent, under the disclosed conditions initiates a coupling reaction to form the UVB or DVB polymer.

The coupling reaction is terminated by addition of a quenching agent to the reaction mixture in an amount relative to the reaction solvent of up to 0.10% by volume, alternatively up to 0.05% by volume, alternatively, up to 0.03% by volume, alternatively up to 0.02% by volume or alternatively, up to 0.01% by volume. Examples include alcohols containing between 1 and 10 carbons atoms, e.g., 2-ethylhexanol or methanol. The quenching agent is added after the coupling reaction has proceeded at at least 60° C. for 5 minutes, alternatively for 10 minutes, alternatively for 15 minutes, or, alternatively for 20 minutes.

Properties:

The composition will thermally decouple such that the coupling efficiency reduces from greater than 45% to less than 25% in less than 24 hours at a temperature of greater 180° C. In one embodiment, after blending in asphalt for up to 16 hours at 180° C. or higher, the composition has a coupling efficiency of less than 30%, alternatively less than 25%, alternatively less than 20%. Low coupling efficiency is desirable for low processing viscosity in end-use applications such as roofing, pavements and adhesives. After blending in asphalt for 24 hours or longer at 180° C. or higher, the composition has a coupling efficiency of less than 30%, alternatively less than 25%, alternatively less than 20%.

The composition has a melt viscosity at 110° C. or less of greater than 2.0E7 Poise, alternatively greater than 3.0E7 Poise, or alternatively greater than 4.0E7 Poise. It is desirable to have a high melt viscosity for easy finishability.

When used in asphalt compositions, the asphalt compositions exhibits high performance properties as defined by AASHTO M332 including low non-recoverable creep compliance, $J_{nr}$, related to rutting resistance, high elastic recovery, R %, related to resilience, low initial viscosity related to processing, low rate of viscosity increase related to long term storage.

Applications:

The block copolymer composition is suitable for a number of applications, including but not limited to coating, adhesives, road & construction (e.g., in asphalt compositions) or roofing applications (e.g., in self-adhesive roofing). In an embodiment of an asphalt composition, the asphalt composition comprises: the block copolymer compositions; b) an asphalt binder; and c) optionally a chemical crosslinking agent such as sulfur or a sulfur donor compound. The block copolymer can be used in one embodiment in dosages from 3 to 10 wt. % in one embodiment, and can be as high as 20%.

The block copolymer compositions are suitable for use in road & paving applications to modify asphalt compositions, e.g., to increase high temperature modulus and elasticity, to increase resistance to heavy traffic loading and toughening the asphalt matrix against damage accumulation through repetitive loading. The block copolymer composition can also be used in asphalt emulsions for applications including pavement preservation, rehabilitation, and reconstruction. Examples of applications or treatments using asphalt emulsions include fog or rejuvenating seal, scrub seal, sand seal, chip seal, tack coat, slurry seal, micro surfacing, CIR, FDR, and crack filler or as a material for prevention of reflective cracking of pavements. In one embodiment, the composition is used as an asphalt binder for use in hot mix asphalt and other paving applications, or other applications including roofing, adhesives, coatings, and films, among other embodiments.

In an embodiment of an asphalt composition, the asphalt composition further comprises at least a binder in an amount of from 85 weight percent (wt. %) to 98 wt. %, alternatively from 90 wt. % to 97.5 wt. %, or alternatively from 91 wt. % to 93 wt. % based on the weight of the asphalt composition. The preparation of an asphalt composition is initiated by heating an asphalt material under agitation to a temperature of 180° C. or higher. In an embodiment, the block copolymer is mixed with a heated asphalt binder in an amount of from 2% wt. to 15% wt. or alternatively from 2.5% wt. to 10% wt. or alternatively from 7% wt. to 9% wt. based on the total weight of the asphalt binder and the composition. The composition is stirred until it is fully dispersed into asphalt binder. Alternatively, an asphalt composition is prepared by mixing the composition into an asphalt material directly in amounts between 5% wt. and 30% wt.; alternatively 10-20% wt. based on the total weight of the asphalt binder to produce a concentrated composition. Subsequently, the mixture is diluted with additional asphalt binder to the desired final concentration.

A chemical crosslinking agent such as sulfur or other sulfur donor compound is used to crosslink the composition in the asphalt composition. Alternatively, thermal curing process is used to crosslink the composition.

The block copolymer can also be used in asphalt composition as a bituminous emulsion in an amount ranging from 1 to 9 wt. % based on the amount of asphalt in the emulsion composition. The bituminous emulsions can be useful in a road and paving applications including fog seal, rejuvenator seal, scrub seal, prime coat, tack coat, chip seal, slurry seal, micro surfacing, and in central-plant or in-place recycling (cold in-place recycling, cold central plant recycling, full depth reclamation, and hot in-place recycling). The bituminous emulsions can also be used as pavement surface treatments for sealing and repairing roads, drive ways, parking lots and other black topped surfaces, as well as in recycle applications.

EXAMPLES

The examples are given by way of illustration and are not intended to limit the specification or the claims to follow in any manner.

Example 1—UVB Polymer Synthesis 339 g styrene was added to 6 liters of cyclohexane at 55° C., after which 21.1 mmol of sec-butyl lithium was added. The reaction was completed after 19 minutes. The temperature was raised to 65° C. and thereafter, 14 mL 1,2-diethoxypropane and 721 g of butadiene were added over a period of 25 minutes. The temperature of the reaction mixture rose to 70° C. The polymerization was allowed to proceed at this temperature for 38 minutes. 0.75 mL of the coupling agent methyl benzoate was then added to the reaction mixture. The reaction mixture was allowed to stand for 40 minutes at 70° C. then terminated with 2 mL of 2-ethylhexanol. After cooling down the reaction mixture, the cement was neutralized by adding $H_2O$ and sparging with $CO_2$. After that, 0.2 w % of IRGANOX 1076 and 0.2 w % of IRGAFOS 168 were added for stabilization. The product was isolated by steam stripping to give white crumbs. In following examples this polymer is designated Inv 1.

Example 2—DVB Polymer Synthesis 22.8 mMol of sec-butyl lithium was added to 6 liters of cyclohexane at 55° C., after which 360 g of styrene was added. The reaction was complete after 19 minutes and the temperature of the reaction mixture was kept stable at 55° C. Thereafter the reaction mixture was heated to 60° C. and 369 g of butadiene was added over a period of 8 minutes and was left to react to >99% conversion over a time span of 25 minutes. Next, 2.9 mL of 1,2-diethoxypropane was added. This was followed by the addition of 358 grams of butadiene over a period of 17 minutes. After the addition was completed the polymerization was allowed to proceed at 60° C. for 30 minutes. At this point in the polymerization, a sample was taken from the reaction and analyzed using GPC test method ASTM D5296-11. 0.85 grams of the coupling agent methyl benzoate was then added to the reaction mixture. The reaction mixture was allowed to stand for 15 minutes at 60° C. then terminated with 1.7 mL of 2-ethylhexanol. After cooling the reaction mixture, the cement was neutralized by adding $H_2O$ and sparging with $CO_2$. After that, 0.2 w. % of IRGANOX 1076 and 0.2 w % of IRGAFOS 168 were added for stabilization. The product was isolated by steam stripping to give white crumbs. In following examples this polymer is designated Inv 2. Properties of these two polymers are shown in Table 1. Characteristics of the inventive and comparative polymers shown in Table 2. Inventive polymers 4-13 were prepared on a larger scale and were hot water coagulated, dewatered and pelletized in a dewatering extruder, and dried.

TABLE 1

| Property | DVB | UVB |
| --- | --- | --- |
| (S) - Styrene block molecular weight* | 15.8 | 15.4 |
| (S-B1) - Styrene plus First Butadiene Stage molecular weight* | 34 | |
| (S-B1-B2) Styrene-plus first butadiene stage plus second butadiene stage molecular weight* | 52 | |
| Diblock molecular weight* | | 52 |
| Triblock molecular weight* | 104 | 105 |
| Styrene content, % by weight basis the total block copolymer | 34 | 32 |
| Coupling efficiency, % | 48 | 47 |
| Total overall vinyl content for block copolymer, mol % | 34 | 35 |
| B2 block (second butadiene stage) vinyl content (calculated), mol %** | 59.7 | |

*The molecular weight references are peak true molecular weights.
**The vinyl content of the second polybutadiene block B2 was calculated based on the measured vinyl content of the first polybutadiene block B1, the measured vinyl content of the whole polymer, and the relative molecular weights of polybutadiene blocks B1 and B2.

TABLE 2

Inventive and Comparative Polymers

| | | | | | | | B1 | | B2 | |
| Polymer | Step 1 MW (kDa) | Step 3 MW (kDa) | CE (%) | Coupling agent | Vinyl (%) | Structure | % | Target Vinyl % | % | Target Vinyl % |
| --- | --- | --- | --- | --- | --- | --- | --- | --- | --- | --- |
| Comp 1 | 16.1 | 108 | 23.0 | Epon 826 | 10 | UVB | | | | |
| Comp 2 | 15.4 | 110 | 83.0 | Epon 826 | 10 | UVB | | | | |
| Comp 3 | 16.1 | 108 | 25.0 | Epon 826 | 58 | UVB | | | | |
| Comp 4 | 18.0 | 159 | 45.0 | Epon 826 | 28 | DVB | 67 | 10 | 33 | 60 |
| Inv 1 | 15.4 | 104 | 46.8 | MBZ | 35 | UVB | | | | |
| Comp 5 | 15.7 | 103 | 21.0 | Epon 826 | 36 | UVB | | | | |
| Inv 2 | 15.8 | 104 | 48.3 | MBZ | 34 | DVB | 50 | 10 | 50 | 60 |
| Comp 6 | 15.7 | 104 | 23.6 | Epon 826 | 34 | DVB | 50 | 10 | 50 | 60 |
| Inv 3 | 15.7 | 105 | 49.7 | MBZ | 10 | UVB | | | | |
| Inv 4 | 15.7 | 106 | 54.3 | MBZ | 38 | UVB | | | | |
| Inv 5 | 16.0 | 109 | 52.6 | MBZ | 39 | DVB | 50 | 10 | 50 | 60 |
| Inv 6 | 16.0 | 109 | 53.6 | MBZ | 27 | DVB | 67 | 10 | 33 | 60 |
| Inv 7 | 15.6 | 108 | 75.1 | MBZ | 25 | DVB | 67 | 10 | 33 | 60 |

TABLE 2-continued

Inventive and Comparative Polymers

| Polymer | Step 1 MW (kDa) | Step 3 MW (kDa) | CE (%) | Coupling agent | Vinyl (%) | Structure | B1 % | Target Vinyl % | B2 % | Target Vinyl % |
|---|---|---|---|---|---|---|---|---|---|---|
| Inv 8 | 15.8 | 106 | 77.8 | MBZ | 37 | UVB | | | | |
| Inv 9 | 15.6 | 106 | 72.6 | MBZ | 10 | UVB | | | | |
| Inv 10 | 15.9 | 106 | 76.5 | MBZ | 10 | UVB | | | | |
| Inv 11 | 16.0 | 107 | 79.0 | MBZ | 10 | UVB | | | | |
| Inv 12 | 15.7 | 106 | 66.1 | MBZ | 10 | UVB | | | | |
| Inv 13 | 16.0 | 109 | 54.9 | MBZ | 10 | UVB | | | | |

The finishing characteristics and of the coupled copolymers are shown in Table 3 below. The comparative polymers all have either low melt viscosity or high coupling after 24 hours while the inventive polymers have both high melt viscosity and low coupling after 24 hours which is desirable.

TABLE 3

Melt Viscosity for Manufacturing Finishability

| Sample | Melt Viscosity at 110° C. - Poise | Coupling as produced | Coupling after 24 hours at 180° C. |
|---|---|---|---|
| Comp 1 | 1.82E7 | 22% | 22% |
| Comp 2 | 8.06E7 | 86% | 86% |
| Comp 3 | 1.85E7 | 25% | 25% |
| Comp 4 | | 45% | 45% |
| Inv 2 | 2.11E7 | 47% | 9% |
| Comp 5 | 1.04E7 | 21% | 21% |
| Inv 1 | 2.96E7 | 48% | <10% |
| Comp 6 | 1.33E7 | 24% | 24% |
| Inv 3 | 2.40E7 | 55% | 13% |
| Inv 8 | 4.50E7 | 75% | 7% |
| Inv 10 | 8.65E7 | 76% | 24% |
| Inv 11 | 7.40E7 | 77% | 17% |
| Inv 12 | 6.14E7 | 66% | 23% |
| Inv 13 | 4.45E7 | 55% | 22% |

Examples 3-11—Asphalt Blend Properties

Compositions were prepared as follows: a) Asphalt binder was heated under agitation to 180° C. 2) Polymer was added to asphalt binder at 7.5% wt. of polymer-asphalt binder composition. 3) Composition was continuously stirred until polymer has fully dispersed into asphalt binder. High shear mill was used to assist the process. 4) Sulfur was added. The amount was determined based on weight of asphalt binder and polymer combined. 5) Composition was continuously stirred for 4 hours at 180° C. (sample was collected for evaluation) and for additional 16 hours (sample was collected for evaluation. The samples were evaluated per test methods AASHTO T240, T315 and T316. Evaluations per AASHTO specifications M332 and M320 are shown in Tables 4 and 5. In this example, the performance graded properties of the final asphalt compositions are evaluated according to M320 and M332. It is desirable to have low $J_{nr3.2}$ preferably less than 0.25 and high R $\%_{3.2}$ preferably higher than 80%. At the same time, it is desirable to have low viscosity increase preferably less than 20%. Inventive polymers 1 and 2 are the only ones that show all desirable characteristics.

TABLE 4

Asphalt Blend Evaluations Per AASHTO M332

| Composition Polymer (% wt) | Sulfur (% wt) | $J_{nr3.2}$ 4 hrs | $J_{nr3.2}$ 20 hrs | R $\%_{3.2}$ 4 hrs | R $\%_{3.2}$ 20 hrs | Viscosity, 135° C. (cP) 4 hrs | Viscosity, 135° C. (cP) 20 hrs | Viscosity increase [(20 hr − 4 hr)/20 hr] |
|---|---|---|---|---|---|---|---|---|
| Example 3  7.5% Comp 3 | 0.1 | 0.440 | 0.065 | 70.6 | 91.8 | 1,792 | 2,675 | 49% |
| Example 4  7.5% Comp 4 | 0.1 | 0.495 | 0.222 | 68.5 | 79.3 | 3,425 | 4,350 | 27% |
| Example 5  7.5% Comp 1 | 0.1 | 1.587 | 0.729 | 38.7 | 59.0 | 1,513 | 1,642 | 9% |
| Example 6  7.5% Inv 1 | 0.1 | 1.265 | 0.554 | 41.8 | 61.1 | 1,425 | 1,596 | 12% |
| Example 7  7.5% Inv 1 | 0.2 | 0.350 | 0.200 | 73.1 | 80.5 | 2,017 | 2,338 | 16% |
| Example 8  7.5% Comp 5 | 0.1 | 1.099 | 0.397 | 45.7 | 68.8 | 1,425 | 1,750 | 23% |
| Example 9  7.5% Inv 2 | 0.2 | 0.381 | 0.187 | 71.7 | 81.6 | 1,888 | 2,125 | 13% |
| Example 10  7.5% Inv 2 | 0.3 | 0.111 | 0.057 | 88.7 | 92.4 | 2,763 | 3,675 | 33% |
| Example 11  7.5% Comp 6 | 0.2 | 0.475 | 0.182 | 67.3 | 81.3 | 1,742 | 2,184 | 25% |
| Example 12  7.5% Inv 10 | 0.1 | 1.09 | 0.41 | 43.4 | 67.9 | 2,050 | 2,188 | 7% |
| Example 13  7.5% Inv 13 | 0.1 | 1.29 | 0.52 | 40.9 | 63.7 | 1,863 | 1,900 | 2% |

TABLE 5

Asphalt Blend Evaluations Per AASHTO M320

| Composition Polymer | Sulfur | Original G*/sinδ, 76° C. | | RTFO G*/sinδ, 76° C. | |
|---|---|---|---|---|---|
| (% wt.) | (% wt.) | 4 hrs | 20 hrs | 4 hrs | 20 hrs |
| Example 3  7.5% Comp 3 | 0.1 |  | 3.52 |  | 5.81 |
| Example 4  7.5% Comp 4 | 0.1 |  |  |  |  |
| Example 5  7.5% Comp 1 | 0.1 | 1.49 | 2.00 |  |  |
| Example 6  7.5% Inv 1 | 0.1 | 1.68 | 2.49 | 2.78 | 3.33 |
| Example 7  7.5% Inv 1 | 0.2 | 2.43 | 3.24 | 4.36 | 4.85 |
| Example 8  7.5% Comp 5 | 0.1 | 1.75 | 2.73 | 2.89 | 3.40 |
| Example 9  7.5% Inv 2 | 0.2 | 2.42 | 3.17 | 4.27 | 4.82 |
| Example 10  7.5% Inv 2 | 0.3 | 3.25 | 3.59 | 4.62 | 5.53 |
| Example 11  7.5% Comp 6 | 0.2 | 2.48 | 3.24 | 4.09 | 4.98 |
| Example 12  7.5% Inv 10 | 0.1 | 2.21 | 2.97 |  |  |
| Example 13  7.5% Inv 13 | 0.1 | 1.98 | 2.62 |  |  |

Asphalt compositions are prepared by combining a block copolymer with asphalt binder (bitumen) according to the steps: a) heating asphalt binder under agitation to 180° C. (range of 160-220° C.) for ½ to 1 hour; b) adding the styrenic block copolymers to the asphalt binder at 12-16% wt. of polymer-asphalt binder composition; and c) stirring the composition until the polymer has fully dispersed into asphalt binder. Optional components such as flux oil and fillers are also added. Comp 7 is a commercial radial SBS polymer commonly used in roofing applications. The compositions and properties are listed in Table 6.

TABLE 6

Roofing Compositions

| Composition with SBS (total: 100%) | 160/220 asphalt (wt %) | Flux oil (wt %) | SBS (wt %) | Comp 7 (wt %) | Filler (%) | Softening point R&B (° C.) |
|---|---|---|---|---|---|---|
| Example 14  Comp 3 | 68 | 7.6 | 9 | 5.4 | 10 | 121.0 |
| Example 15  Inv 6 | 68 | 7.6 | 9 | 5.4 | 10 | 120.5 |
| Example 16  Comp 7 | 71.3 | 7.9 | — | 10.8 | 10 | 124.5 |

A certain quantity of the composition is poured into a spacer with defined dimensions including polyethylene fabric carrier. Covered with silicon paper the hot sample is placed in a Pasadena hydraulic press and pressed for 30 seconds with a load of 15000 Pounds at a temperature 15-20° C. above the softening point R&B temperature of the compound. A 2nd spacer is placed on the other side of the carrier, and the procedure is repeated for a period of 5 minutes. The sheet thus created (3 mm thick) is cut from its spacers and samples of 25 mm width are cut for further analysis.

Adhesion is prevented over a length of 30 mm by covering the ends of the membranes with paper. These free ends are used for placing the samples in the clamps of the tensile tester. When establishing the welding, air bubble inclusions can be avoided by a rolling weight just after the moving contact line. Thereafter, the adhesion is enhanced by rolling a weight of 2.0 kg for 10 times over the membranes.

The adhesive strength between the membranes is tested by the T-peel test with an Instron (4501) tensile tester. The ends of a specimen (25 mm each) are clamped in the grips and sample is peeled at a constant rate of displacement of 300 mm/min, at ambient temperature. Sample treatment for this example includes: 24 hr temperature conditioning at 23° C., welding, 24 hr conditioning at 23° C., testing; 24 hr temperature conditioning at 4° C., welding and testing; 24 hr temperature conditioning at 4° C., welding, 1 hr conditioning at 4° C. and testing. The initial tack of the membranes was determined qualitatively using the thumb at ambient temperature as shown in Table 7.

TABLE 7

Roofing Composition Properties

| | Composition | T-peel at 23° C. (24 h, welding, 24 h) [N/25 mm] Av | T-peel at 4° C. (24 h, welding) [N/25 mm] Av | T-peel at 4° C. (24 h, welding, 1 h) [N/25 mm] Av | Tack finger |
|---|---|---|---|---|---|
| Example 14 | Comp 3 | 42.4 | 6.8 | 78.8 | + |
| Example 15 | Inv 6 | 38.3 | 6.3 | 76.8 | + |
| Example 16 | Comp 7 | 30.8 | 6.8 | 32.3 | − |

The terms "a," "an," and "the" are intended, unless specifically indicated otherwise, to include plural alternatives, e.g., at least one. Herein, while compositions and processes are described in terms of "comprising" various components or steps, the compositions and methods can also "consist essentially of" or "consist of" the various components or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

While various embodiments of the present disclosures have been shown and described, modifications thereof can be made by one skilled in the art without departing from the spirit and teachings of the disclosure. The embodiments of the present disclosures described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from 1 to 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure of the present disclosure. Thus, the claims are a further description and are an addition to the embodiment of the present disclosures of the present disclosure. The discussion of a reference in the present disclosure is not an admission that it is prior art to the present disclosure, especially any reference that has a publication date after the priority date of this application. The present disclosures of all patents, patent applications, and publications cited herein are hereby incorporated by reference, to the extent that they provide exemplary, procedural or other details supplementary to those set forth herein.

All publications, patent applications, and patents mentioned herein are incorporated by reference in their entirety. In the event of conflict, the present specification, including definitions, is intended to control. With respect to all ranges disclosed herein, such ranges are intended to include any combination of the mentioned upper and lower limits even if the particular combination is not specifically listed.

The invention claimed is:

1. A coupled block copolymer composition comprising: (i) a diblock copolymer comprising one block of a monovinylaromatic hydrocarbon and one block of a conjugated diene, and having a peak molecular weight from 30,000 to 78,000, and a vinyl content from 8 to 80 mol percent based on the number of repeat monomer units in the conjugated diene block, (ii) a linear triblock copolymer having a peak molecular weight that is 1.5 to 3.0 times the peak molecular weight of the diblock copolymer, and (iii) a multiarm coupled block copolymer having a peak molecular weight that is 1.5 to 9.0 times the peak molecular weight of the diblock copolymer,
 wherein the ratio of (i) to (ii) in the block copolymer composition is less than 1;
 wherein the coupled block copolymer composition has a sufficient coupling efficiency to have a melt viscosity at less than 110° C. of greater than 2.0E7 Poise;
 wherein the composition is prepared in a reaction mixture consisting of a diblock copolymer, a coupling agent, a microstructure control reagent, and a solvent, wherein the diblock copolymer is coupled with the coupling agent, and wherein the coupling agent is represented by Formula I:

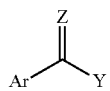

wherein Y is R, OR, SR', or X (where X=F, Cl, Br and/or I); Z is O, S, or NR" where R, R', and R" are independently an alkyl group or an aryl group; and Ar is an aromatic group comprises one or more rings;
 and wherein the coupled block copolymer composition, heated at 180° C. for 24 hours, decouples to a coupling efficiency of less than 20%.

2. The coupled block copolymer composition of claim 1, wherein the multiarm coupled block copolymer is present in an amount of less than 5 wt. % of total mass of the coupled block copolymer composition.

3. The coupled block copolymer composition of claim 1, wherein the composition is a distributed vinyl coupled block copolymer comprising uncoupled copolymers and coupled copolymers, having mixtures of copolymers having formulae S-B1-B2 and (S-B1-B2)$_n$X, or mixtures of copolymers having formulae S-B1-B2, (S-B1-B2)$_n$X, and any of S-B1-B1'-B2 and (S-B1-B1'-B2)$_n$X, wherein X is residue of the coupling agent, n is an integer from 2 to 6, each of B1, B2, B1' and B2 is a conjugated diene block, and S is a monoalkenyl arene block.

4. The coupled block copolymer composition of claim 1, wherein the ratio of the diblock copolymer to the multi-arm coupled block copolymer is from 4:5 to 1:10.

5. The coupled block copolymer composition of claim 1, wherein both the diblock copolymer and the multi-arm coupled block copolymer have a vinyl content from 8 mol % to 60 mol % and a polystyrene content from 20 mol % to 35 mol %.

6. The coupled block copolymer composition of claim 1, wherein the composition has a coupling efficiency ranging from greater than 50 to 90%.

7. The coupled block copolymer composition of claim 1, wherein the composition has a coupling efficiency ranging from greater than 50 to 75%.

8. The coupled block copolymer of claim 1, wherein the coupling agent is represented by the formula:

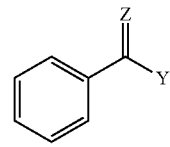

wherein Y is R, OR, SR', or X;
X=F, Cl, Br and/or I;
Z is O, S, or NR";
R, R', and R" each independently comprises an alkyl group or aryl group.

9. The coupled block copolymer composition of claim 8, wherein the coupling agent is methyl benzoate (MBZ).

10. An asphalt composition comprising: a) the coupled block copolymer composition of claim 1; b) an asphalt binder; and c) optionally a chemical crosslinking agent.

11. A self-adhesive roofing composition comprising the coupled block copolymer composition of claim 1.

12. A bituminous emulsion comprising the asphalt composition of claim 10.

13. The bituminous emulsion of claim 12, for use in any of fog seal, rejuvenator seal, scrub seal, prime coat, tack coat, chip seal, slurry seal, micro surfacing, an in-place recycling applications.

14. The bituminous emulsion of claim 13, for use as a pavement surface treatment for sealing and repairing roads, drive ways, parking lots and black topped surfaces.

15. The bituminous emulsion of claim 12, wherein the coupled block copolymer is present in an amount ranging from 1 to 9 wt. % based on the amount of asphalt in the emulsion composition.

16. A waterproofing composition comprising the coupled block copolymer composition of claim 1.

17. A method for preparing a coupled block copolymer composition for use in adhesive and/or asphalt applications, the method comprising:
 providing a diblock copolymer,
 forming a reaction mixture consisting of the diblock copolymer, a coupling agent, a microstructure control reagent, and a solvent, and coupling the diblock copolymer with the coupling agent; in the presence of the microstructure control reagent, to obtain a coupled block copolymer comprising:
  (i) a diblock copolymer comprising one block of a monovinylaromatic hydrocarbon and one block of a conjugated diene having a peak molecular weight from 30,000 to 78,000, each block copolymer has a vinyl content from 8 to 80 mol percent based on the number of repeat monomer units in the conjugated diene block
  (ii) a linear triblock copolymer having a peak molecular weight that is 1.5 to 3.0 times the peak molecular weight of the diblock copolymer, and
  (iii) a multiarm coupled block copolymer having a peak molecular weight that is 1.5 to 9.0 times the peak molecular weight of the diblock copolymer,
wherein the coupling agent is represented by Formula I:

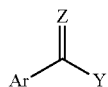

wherein Y is R, OR, SR', or X (where X=F, Cl, Br and/or I); Z is O, S, or NR" where R, R', and R" are independently an alkyl group or an aryl group; and Ar is an aromatic group comprises one or more rings;

wherein the ratio of (i) to (ii) in the block copolymer composition is less than 1;

wherein the coupled block copolymer composition has a sufficient coupling efficiency to have a melt viscosity at less than 110° C. of greater than 2.0E7 Poise;

and wherein the coupled block copolymer composition decouples at a temperature at or above 180° C. and after 24 hours for a coupling efficiency of less than 20%.

18. The method of claim 17, wherein the coupled block copolymer composition has a coupling efficiency ranging from greater than 50% to 90%.

19. The method of claim 17, wherein the coupled block copolymer composition has a coupling efficiency ranging from greater than 50% to 75%.

* * * * *